US012539708B2

(12) United States Patent
Ohashi et al.

(10) Patent No.: US 12,539,708 B2
(45) Date of Patent: Feb. 3, 2026

(54) PRINTING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Takakazu Ohashi, Kanagawa (JP); Kota Uchida, Kanagawa (JP); Yoshiaki Suzuki, Chiba (JP); Kengo Nieda, Kanagawa (JP); Kohei Fukui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 18/108,180

(22) Filed: Feb. 10, 2023

(65) Prior Publication Data

US 2023/0264494 A1 Aug. 24, 2023

(30) Foreign Application Priority Data

Feb. 24, 2022 (JP) ................................ 2022-027012

(51) Int. Cl.
*B41J 13/00* (2006.01)
*B41J 13/14* (2006.01)
*B41J 11/00* (2006.01)

(52) U.S. Cl.
CPC ........... *B41J 13/0027* (2013.01); *B41J 13/14* (2013.01); *B41J 11/0095* (2013.01)

(58) Field of Classification Search
CPC ..... B41J 13/0027; B41J 13/14; B41J 11/0095
See application file for complete search history.

(56) References Cited

U.S. PATENT DOCUMENTS

| | | | |
|---|---|---|---|
| 5,356,229 | A | 10/1994 | Hickman et al. |
| 5,469,196 | A | 11/1995 | Okazaki et al. |
| 7,934,788 | B2 | 5/2011 | Matsumura |
| 9,039,124 | B2 | 5/2015 | Ogimura et al. |
| 9,533,517 | B2 | 1/2017 | Ito et al. |
| 9,662,908 | B2 | 5/2017 | Yoshida |
| 10,108,114 | B2 | 10/2018 | Mori |

(Continued)

FOREIGN PATENT DOCUMENTS

| | | | | |
|---|---|---|---|---|
| EP | 1790486 | A1 * | 5/2007 | .......... B41J 11/0005 |
| JP | 2004-160797 | A | 6/2004 | |

(Continued)

OTHER PUBLICATIONS

U.S. Appl. No. 18/108,289, Kota Uchida Kohei Fukui Yoshiaki Suzuki Takakazu Ohashi Kengo Nieda, filed Feb. 10, 2023.

(Continued)

*Primary Examiner* — Sharon Polk
(74) *Attorney, Agent, or Firm* — Venable LLP

(57) ABSTRACT

A printing apparatus includes a conveyance unit arranged on an upstream side of a printing unit with respect to a conveyance direction of a print medium and configured to convey the print medium to the printing unit, and a control unit configured to, after a start of printing of the print medium by the printing unit, regulate the printing by the printing unit during a time when a leading edge of the print medium conveyed by the conveyance unit is passing through a set section preset on a conveyance path of the print medium.

10 Claims, 13 Drawing Sheets

(56) References Cited

U.S. PATENT DOCUMENTS

| | | | | |
|---|---|---|---|---|
| 11,433,693 | B2 | 9/2022 | Furusawa et al. | |
| 2015/0070455 | A1* | 3/2015 | Mimoto | B41J 11/0095 347/104 |
| 2018/0215119 | A1 | 8/2018 | Kaji et al. | |
| 2019/0232689 | A1 | 8/2019 | Ohashi et al. | |
| 2020/0307281 | A1* | 10/2020 | Arakane | B41J 11/008 |
| 2022/0169477 | A1 | 6/2022 | Fukui et al. | |

FOREIGN PATENT DOCUMENTS

| | | | |
|---|---|---|---|
| JP | 2006-224506 | A | 8/2006 |
| JP | 2008-200893 | A | 9/2008 |
| JP | 2011-161719 | A | 8/2011 |
| JP | 2012-091361 | A | 5/2012 |
| JP | 2015-047710 | A | 3/2015 |
| JP | 2016-153180 | A | 8/2016 |
| JP | 2017-044720 | A | 3/2017 |
| JP | 2017-078810 | A | 4/2017 |

OTHER PUBLICATIONS

U.S. Appl. No. 18/108,415, Kohei Fukui Kota Uchida Yoshiaki Suzuki Takakazu Ohashi Kengo Nieda, filed Feb. 10, 2023.

Office Action dated Aug. 1, 2025, in Chinese Patent Application No. 202310126785.6.

Office Action dated Dec. 15, 2025, in Japanese Patent Application No. 2022-027012.

* cited by examiner

| TYPE | | SECTION M1 | SECTION M2 |
|---|---|---|---|
| GLOSSY PAPER | ROLL SHEET | SETTING | SETTING |
| | CUT SHEET | NON-SETTING | SETTING |
| PLAIN PAPER | ROLL SHEET | SETTING | NON-SETTING |
| | CUT SHEET | NON-SETTING | NON-SETTING |

PRINTING APPARATUS, CONTROL METHOD, AND NON-TRANSITORY COMPUTER-READABLE STORAGE MEDIUM

BACKGROUND OF THE INVENTION

Field of the Invention

The present invention relates to a printing apparatus, a control method, and a non-transitory computer-readable storage medium.

Description of the Related Art

A printing apparatus performs printing by a printhead while conveying a print medium to the printhead. Various techniques have been proposed to improve the print quality of an image. Japanese Patent Laid-Open No. 2004-160797 discloses a conveyance control technique for reducing image quality degradation that occurs when a print medium separates from a feed roller.

A change of the conveyance state of a print medium affects the print quality or print efficiency. For example, a curled print medium like a roll sheet may lift during conveyance and contact the printhead. If the print medium contacts the printhead, the print medium becomes dirty, or jam occurs. Also, when the print medium reaches a discharge roller, the operation switches from conveyance by only the conveyance roller to conveyance by the conveyance roller and the discharge roller. This may change the conveyance amount of the print medium and lower the print quality.

SUMMARY OF THE INVENTION

The present invention provides a print control technique corresponding to a change of the conveyance state of a print medium.

According to an aspect of the present invention, there is provided a printing apparatus comprising: a conveyance unit arranged on an upstream side of a printing unit in a conveyance direction of a print medium and configured to convey the print medium to the printing unit, and a control unit configured to, after a start of printing for the print medium by the printing unit, regulate the printing by the printing unit during a time when a leading edge of the print medium conveyed by the conveyance unit is passing through a set section preset on a conveyance path of the print medium.

Further features of the present invention will become apparent from the following description of exemplary embodiments (with reference to the attached drawings).

DESCRIPTION OF THE EMBODIMENTS

Figure 1:
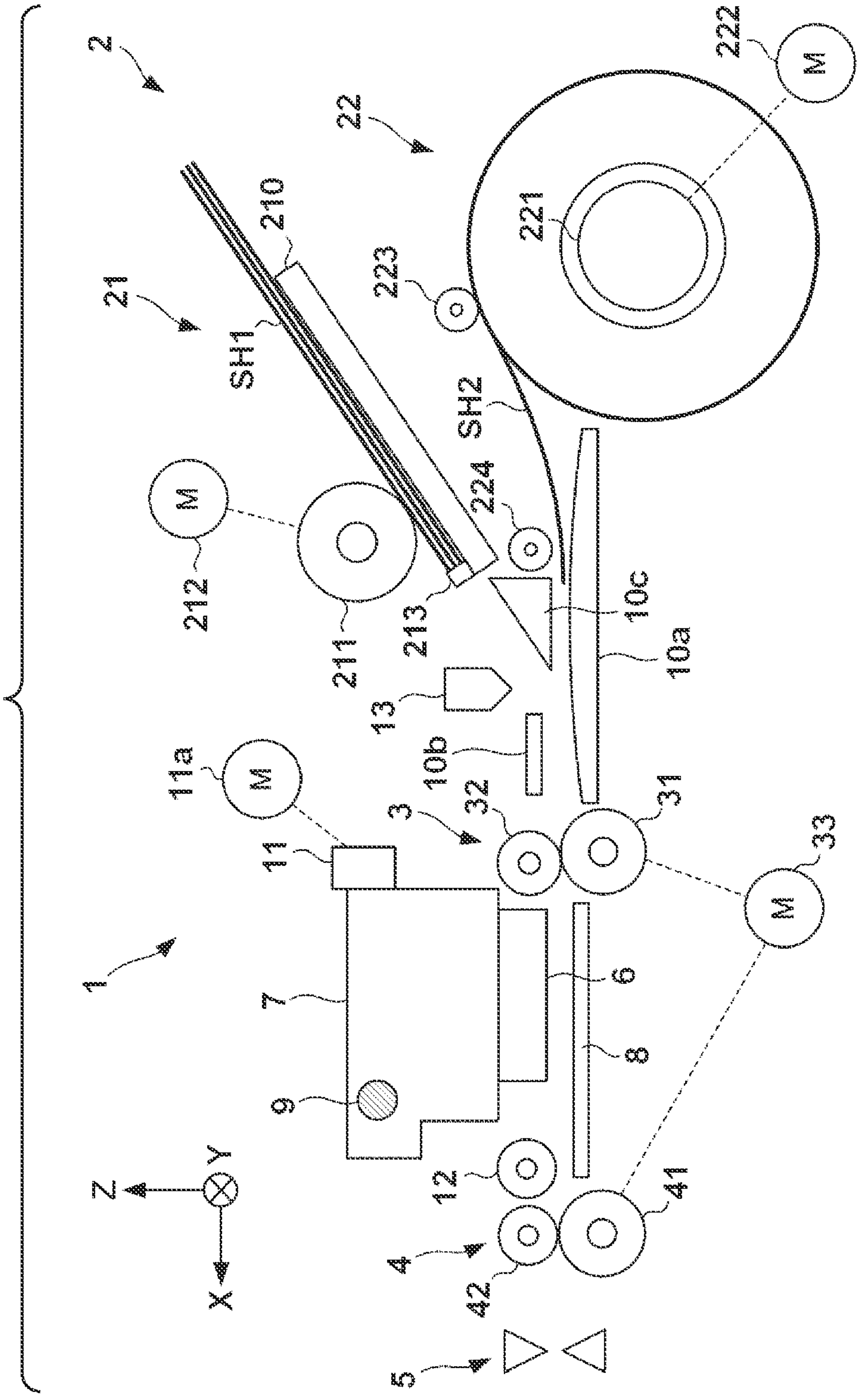
FIG. 1 is a schematic view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Outline of Printing Apparatus>

FIG. 1 is a schematic view of a printing apparatus 1 according to this embodiment. In this embodiment, a case will be described in which the present invention is applied to a serial type inkjet printing apparatus, but the present invention is also applicable to printing apparatuses of other types. In the drawings, an arrow X and an arrow Y indicate horizontal directions orthogonal to each other, and an arrow Z indicates a vertical direction. A downstream side and an upstream side are based on the conveyance direction of a print medium.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, a plastic film, and the like may be used as print media.

The printing apparatus 1 includes, as a mechanism for conveying a print medium, a feed unit 2, a conveyance unit 3, and a discharge unit 4, which are arranged from the upstream side in the conveyance direction of a print medium. In the following description, an upstream side and a downstream side are based on the conveyance direction of a print medium. The feed unit 2 includes a feed unit 21 which feeds a sheet SH1 as a print medium, and a feed unit 22 which feeds, as a print medium, a sheet SH2 different from the sheet SH1. In this embodiment, the print media for printing can be selectively fed by the two feed units 21 and 22.

The feed unit 21 includes a feeder tray 210 (stacking section) on which a plurality of sheets SH1 can be stacked, a feed roller 211, and a separation section 213. The sheet SH1 is a cut sheet (to be sometimes referred to as the cut sheet SH1 hereinafter) stacked on the feeder tray 210 in a posture in which the widthwise direction of the sheet SH1 matches the Y direction. The feed roller 211 is rotated by a driving force of a feed motor 212, and abuts against the top cut sheet SH1 stacked on the feeder tray 210, thereby conveying it to the downstream side. The separation section 213 is provided in the downstream-side end section of the feeder tray 210. The separation section 213 has a structure (for example, separation claws) which separates the cut sheets SH1 on the feeder tray 210 one by one upon conveying the cut sheets SH1 by the feed roller 211.

The sheet SH2 is a roll sheet obtained by winding one sheet into a roll form around a cylindrical core (to be sometimes referred to as the roll sheet SH2). The feed unit 22 includes a support section 221 which rotatably supports the roll sheet SH2. The roll sheet SH2 is supported in a posture in which the widthwise direction of the roll sheet SH2 (the axial direction of the roll) matches the Y direction. The support section 221 is rotated by a driving force of a feed motor 222, thereby rotating the roll sheet SH2. Depending on the rotation direction of the feed motor 222, a feed operation of feeding the roll sheet SH2 to the downstream side and a winding operation can be performed. The feed unit 22 includes a roller 223 which is pressed against the outer peripheral surface of the roll sheet SH2 by a spring or the like (not shown). The roller 223 is a free rotary body, and presses the outer peripheral surface of the roll sheet SH2 such that the feed operation and the winding operation of the roll sheet SH2 are stably performed.

A rotation of the support section 221 causes the roll sheet SH2 to pass between a sheet guide 10 and a roller 224, which is a free rotary body arranged so as to face the sheet guide 10, and be conveyed to the downstream side. The conveyance path of the cut sheet SH1 and the conveyance path of the roll sheet SH2 are merged at a merging section on the downstream side of a partition member 10*c*. The conveyance path after merging passes between a sheet guide 10*a* and a sheet guide 10*b* facing the sheet guide 10*a* and reaches the conveyance unit 3.

The conveyance unit 3 is arranged on the upstream side of a printhead 6 and conveys the print medium (cut sheet SH1 or roll sheet SH2) conveyed by the feed unit 2 to the printhead 6. The conveyance unit 3 includes a driving roller 31 and a driven roller 32 (pinch roller) pressed against the driving roller 31 by a spring or the like (not shown). The driving roller 31 is rotated by a driving force of a conveyance motor 33. A forward rotation of the conveyance motor 33 causes the print medium to be nipped in a nip section between the driving roller 31 and the driven roller 32, and the print medium (cut sheet SH1 or roll sheet SH2) is conveyed between the printhead 6 and a support member 8 to the downstream side in the X direction. Upon the winding operation of the roll sheet SH2, a backward rotation of the conveyance motor 33 can cause the conveyance unit 3 to convey the roll sheet SH2 to the upstream side.

The support member 8 is a member configured to support, from the lower side, the print medium conveyed by the conveyance unit 3. In this embodiment, the support member 8 is one member, but may be formed by a plurality of members divided in the X direction. A regulation member 12 is arranged at a position facing the support member 8 and regulates a lift of the print medium.

The discharge unit 4 is arranged on the downstream side of the printhead 6 and conveys the print medium (cut sheet SH1 or roll sheet SH2) conveyed by the conveyance unit 3 to the outside of the apparatus. The discharge unit 4 includes a driving roller 41, and a spur 42 arranged to face the driving roller 41 and pressed against the driving roller 41 by a spring or the like (not shown). The driving roller 41 is a rotary member that is rotated by a driving force of the conveyance motor 33 and conveys the print medium to the downstream side. The spur 42 is a rotary member capable of rotating together with the driving roller 41, and the print medium is nipped in the nip section between the driving roller 41 and the spur 42 and conveyed.

Note that in this embodiment, the conveyance motor 33 is shared by the conveyance unit 3 and the discharge unit 4, but a configuration in which individual motors are provided may be employed.

A cutting unit 5 is provided on the downstream side of the discharge unit 4. The cutting unit 5 cuts the roll sheet SH2 having undergone printing. The cutting unit 5 includes, for example, a cutter including circular round blades arranged one above and one below and a moving mechanism (not shown) that moves the cutter in a direction (the Y direction in this embodiment) intersecting the conveyance direction of the print medium. The cutter stands by outside the conveyance path of the print medium. At the time of cutting, the cutter is moved so as to cross the conveyance path, thereby cutting the roll sheet SH2.

The printhead 6 is arranged on the downstream side of the conveyance unit 3 and the upstream side of the discharge unit 4. The printhead 6 performs printing on the print medium (cut sheet SH1 or roll sheet SH2). In this embodiment, the printhead 6 is an inkjet printhead that performs printing on a print medium by discharging ink. The printhead 6 is supported by a carriage 7.

The carriage 7 is reciprocated by a driving unit 11 in the direction intersecting the print medium. In this embodiment, the carriage 7 is reciprocated in the Y direction by the guide of a guide shaft 9 extending in the Y direction. The driving unit 11 is a mechanism using a carriage motor 11*a* as a driving source, and is, for example, a belt transmission mechanism including a driving pulley and a driven pulley, which are apart in the Y direction, and an endless belt wound around these pulleys. The carriage 7 is connected to endless belt. When the carriage motor 11*a* rotates the driving pulley, the endless belt travels, and the carriage 7 moves. The printhead 6 may exchangeably be attached to the carriage 7.

As described above, the printing apparatus 1 according to this embodiment is a serial type printing apparatus in which the printhead 6 is mounted on the carriage 7. By alternately repeating a conveyance operation (intermittent conveyance operation) of conveying the print medium by a predetermined amount by the conveyance unit 3 and a printing operation performed while the conveyance by the conveyance unit 3 is stopped, print control of the print medium is performed. The printing operation is an operation of discharging ink from the printhead 6 while moving the carriage 7 mounted with the printhead 6.

The printing apparatus 1 includes a detection unit 13. The detection unit 13 detects the print medium at a position on the upstream side of the conveyance unit 3 and on the downstream side of the feed unit 2. The detection unit 13 is, for example, an optical sensor that detects the print medium. Alternatively, the detection unit 13 is formed by, for example, an arm member which is provided in the conveyance path of the print medium so as to be swingable and swings due to interference with the print medium, and a sensor that detects the swinging motion of the arm member.

<Control Unit>

Figure 2:
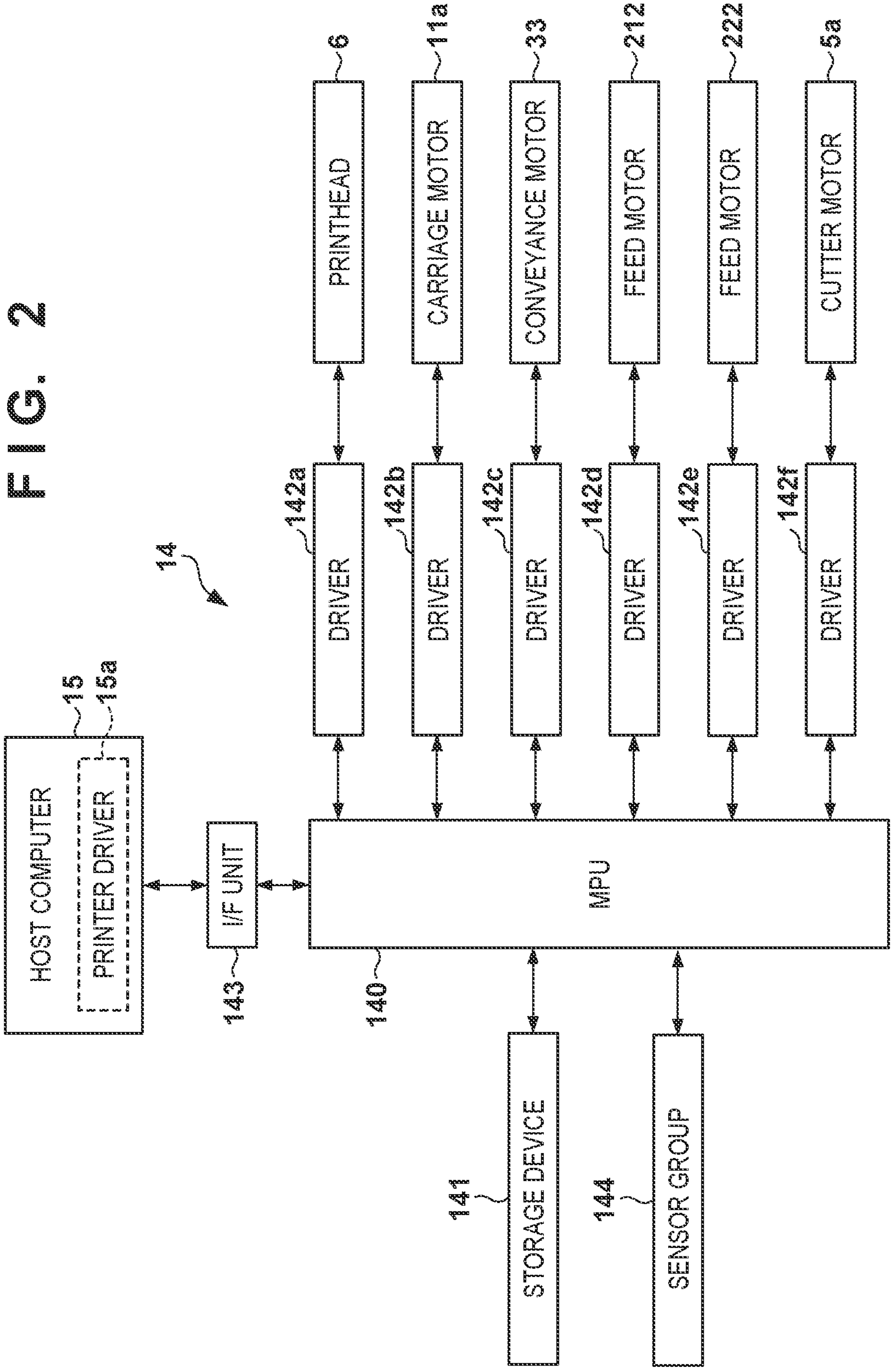
FIG. 2 is a block diagram of the control unit of the printing apparatus shown in FIG. 1.

FIG. 2 is a block diagram of a control unit 14 of the printing apparatus 1. An MPU 140 is a processor that controls respective operations of the printing apparatus 1, and controls data processing and the like. The MPU 140 controls the entire printing apparatus 1 by executing programs stored in a storage device 141. The storage device 141 is formed by, for example, a ROM or a RAM. The storage device 141 stores, in addition to programs executed by the MPU 140, various kinds of data required for processing such as data received from a host computer 15.

The MPU 140 controls the printhead 6 via a driver 142*a*. The MPU 140 controls the carriage motor 11*a* via a driver 142*b*. The MPU 140 also controls the conveyance motor 33, the feed motors 212 and 222, and a cutter motor 5*a* via drivers 142*c* to 142*f*, respectively. The cutter motor 5*a* is a driving source of the cutting unit 5.

A sensor group 144 includes a sensor (not shown) that detects the position of the carriage 7 in the Y direction, and a sensor (not shown) that detects the rotation amount of the conveyance motor 33, in addition to the detection unit 13. The sensor group 144 also includes a sensor (not shown) that detects the rotation amount of the feed motor 212, and a sensor that detects the rotation amount of the feed motor 222. By detecting the rotation amount of the conveyance motor 33 and the rotation amount of the feed motor 222, the feed amount or winding diameter of the roll sheet SH2 can be calculated. The sensor group 144 also includes a sensor that detects the temperature and humidity of the installation environment of the printing apparatus 1.

Note that the position of the leading edge of the print medium can be calculated in the following way. First, after the leading edge of the print medium is detected by the detection unit 13, in a state in which the conveyance unit 3 stops conveyance, the feed motor 212 or 222 is driven until the leading edge of the print medium abuts against the nip section of the conveyance unit 3. Note that the distance from the detection unit 13 to the conveyance unit 3 in the X direction is known. Even after the leading edge of the print medium abuts against the nip section of the conveyance unit 3, feed of the print medium by the feed motor 212 or 222 is continued for a while to deflect the print medium, thereby correcting skewing of the print medium. After that, the conveyance unit 3 is driven to convey the print medium. By detecting the rotation amount of the conveyance motor 33, the conveyance distance of the print medium, that is, the position of the leading edge of the print medium in the conveyance direction can be calculated.

The host computer 15 is, for example, a personal computer or a mobile terminal (for example, a smartphone, a tablet terminal, or the like) used by a user. The host computer 15 is installed with a printer driver 15*a* which performs communication between the host computer 15 and the printing apparatus 1. The printing apparatus 1 includes an interface unit 143, and communication between the host computer 15 and the MPU 140 is performed via the interface unit 143. For example, when the user inputs an execution instruction of the printing operation to the host computer 15, the printer driver 15*a* collects data of an image to be printed and setting regarding the printing (information such as the quality of the print image), and instructs the printing apparatus 1 to execute print control. An execution instruction of print control is sometimes referred to as a print job.

<Lift Suppression>

Figure 3:
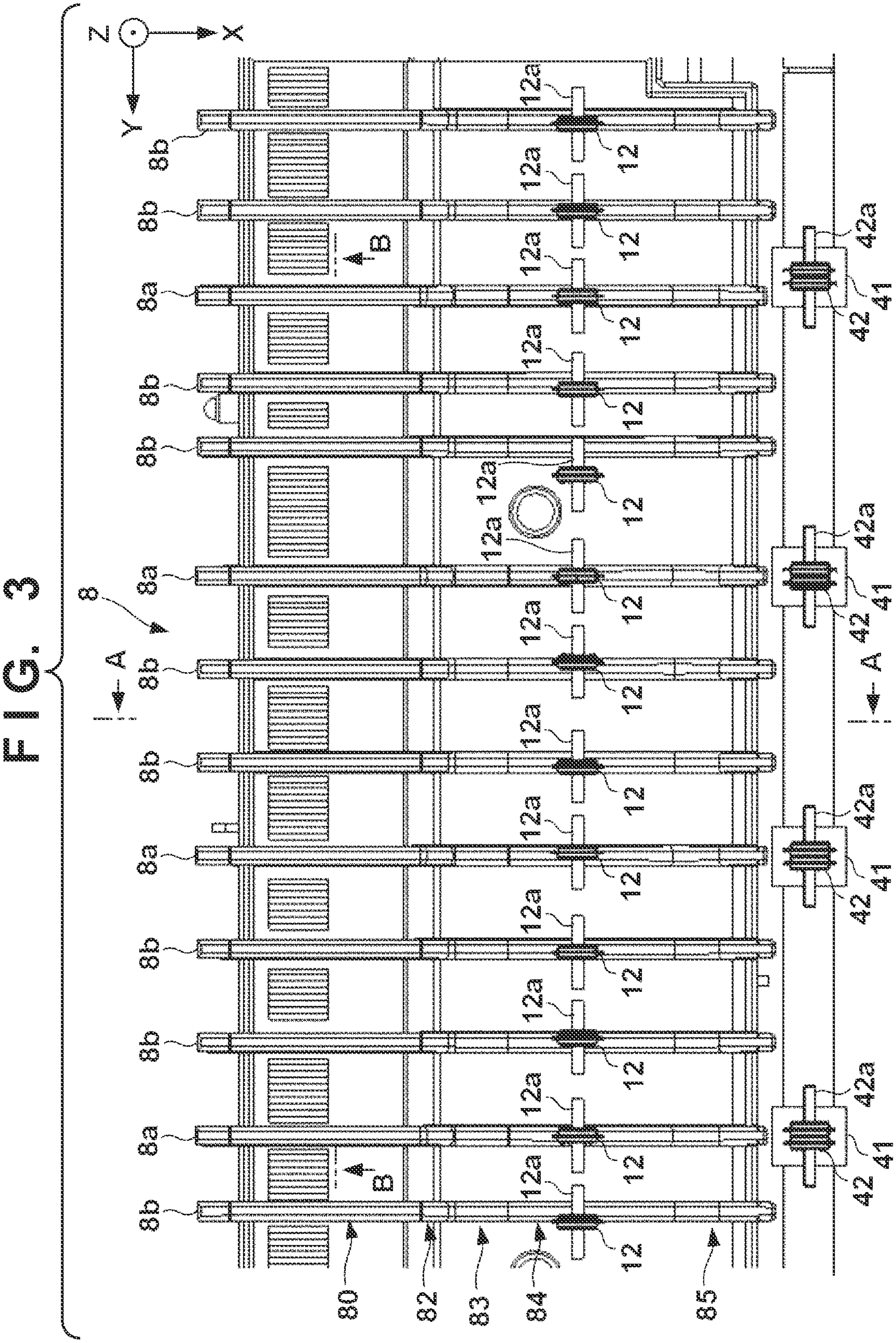
FIG. 3 is a plan view of a support member.
Figure 4:
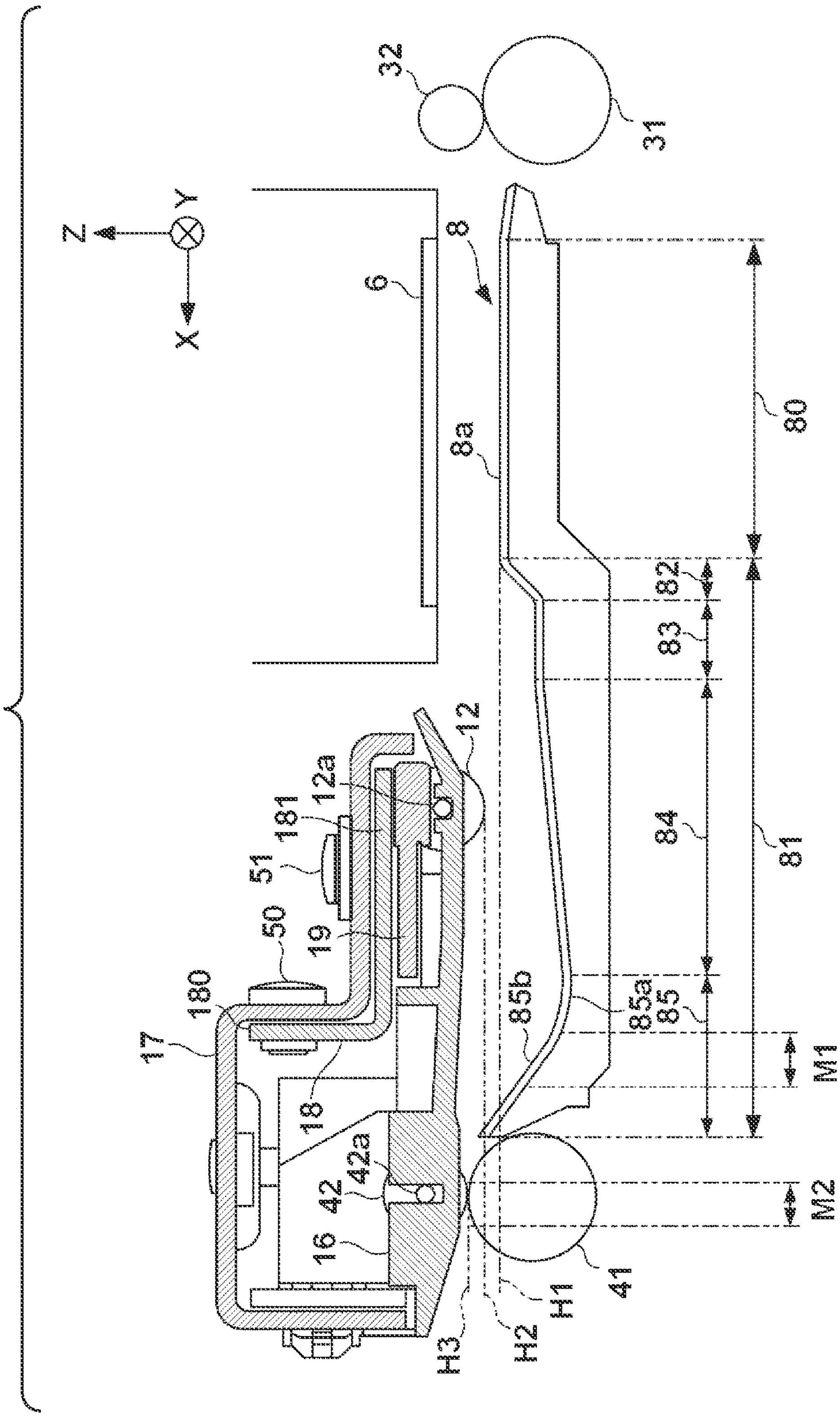
FIG. 4 is a sectional view taken along a line A-A in FIG. 3.
Figure 5:
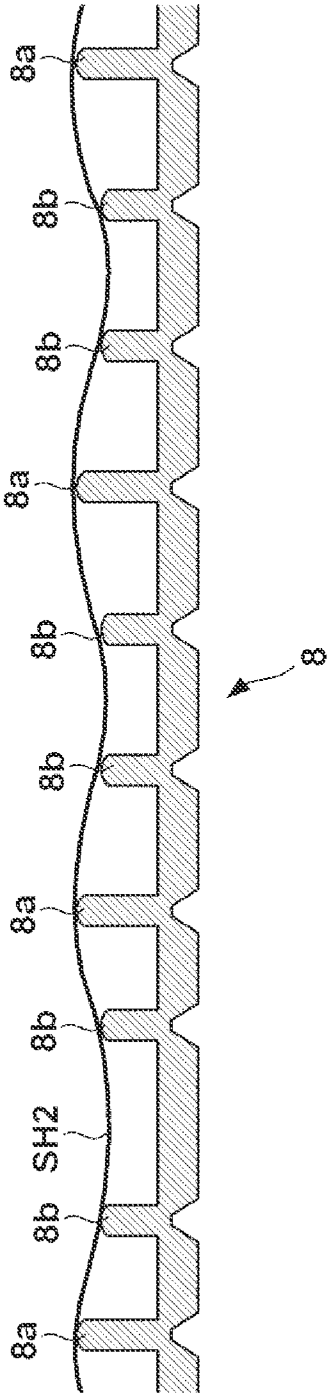
FIG. 5 is a sectional view taken along a line B-B in FIG. 3.

A structure for suppressing a lift of a print medium will be described in correspondence with FIGS. 3 to 5. FIG. 3 is a plan view of the support member 8, in which the spur 42 and the regulation member 12 are also shown. FIG. 4 is a sectional view taken along a line A-A in FIG. 3, and FIG. 5 is a sectional view taken along a line B-B in FIG. 3;

The support member 8 includes a plurality of ribs 8*a* and 8*b* arrayed in the Y direction. Each of the ribs 8*a* and 8*b* is a plate-shaped member extending in the X direction, and their tops form the conveyance support surface for a print medium. In this embodiment, the rib 8*a* and the rib 8*b* have different heights (Z-direction lengths). The plurality of relatively low ribs 8*b* are arranged between the relatively high ribs 8*a*. For this reason, even if the print medium extends upon application of ink, the print medium can be supported along the relatively low ribs 8*b*. FIG. 5 shows a mode in which the extended roll sheet SH2 is supported by the ribs 8*a* and the ribs 8*b*. That is, it is possible to prevent the print medium from extending and curving upward and thus prevent the print medium from contacting the printhead 6.

Note that the rib 8*a* and the rib 8*b* are different only in the height and have the same contour shape (the profile on the X-Z plane). The configuration of the ribs 8*a* will mainly be described below, and the description also applies to the ribs 8*b*.

The rib 8*a* includes a plurality of parts in the X direction. More specifically, the rib 8*a* includes a platen section 80 and a guide section 81. The platen section 80 is a part facing the printhead 6, and forms a support surface flat in the X direction.

The guide section 81 is a part that guides the movement of the leading edge of the print medium that has passed through the printhead 6. The guide section 81 includes a declined section 82, a connecting section 83, a declined section 84, and an inclined section 85 sequentially from the upstream side. The declined section 82 is started from a position slightly on the upstream side of the downstream end (nozzles at the downstream end) of the printhead 6 in the X direction, and with respect to a support height H1 of the print medium in the platen section 80 as a reference, forms a declination declined in a direction of separating from the support height H1 to the downstream side. The declination is a linear declination without curves. The connecting section 83 is a section that connects the declined section 82 and the declined section 84, and is a flat surface parallel to the support height H1. The declined section 82 and the declined section 84 may continuously be formed without providing the connecting section 83.

The declined section 84 forms a declination declined in a direction of separating from the support height H1 to the downstream side. However, the declination is more moderate than that of the declined section 82. The declination is a linear declination without curves. The inclined section 85 forms an inclination inclined in a direction of approaching the support height H1 to the downstream side. The inclined section 85 includes a curved section 85*a* on the upstream side, and a linear section 85*b* that continues from the curved section 85*a* to the downstream side. The curved section 85*a* is a section extended from the lower end of the declined section 84 to form an arc such that the declination smoothly transitions to an inclination. The linear section 85*b* is a linear inclined surface without curves.

In this embodiment, the regulation member 12 is a rotary member in a form similar to the spur 42 and can freely rotate about a shaft 12*a* in the Y direction. Note that the regulation member 12 need only have a form capable of contacting the print medium and preventing its lift. Not a rotary member as in this embodiment but a fixed member may be used. However, if a rotary member is used, like this embodiment, the conveyance of the print medium whose lift is regulated can be continued more smoothly.

The regulation member 12 is arranged at a position facing the guide section 81 and, more particularly, arranged at a position facing the declined section 84. If arranged at this position, the regulation member 12 can more reliably regulate a lift of the print medium when the leading edge of the print medium moves from the declined section 84 to the inclined section 85 and the print medium lifts. The relationship between the support height H1 of the platen section 80, a regulation position (regulation height) H2 of the regulation member 12, and a height H3 of the nip position of the discharge unit 4 is given by H1<H2<H3. By this height relationship, the regulation member 12 can more reliably regulate a lift of the print medium.

A plurality of regulation members 12 are provided, and these are provided at positions corresponding to the ribs 8*a* and 8*b* in the Y direction. More specifically, each regulation member 12 is arranged to face one of the ribs 8*a* and 8*b*. This can regulate a lift of the print medium at an arbitrary position in the widthwise direction (Y direction) of the print medium.

As shown in FIG. 4, the regulation member 12 is supported by a holding member 16 together with the spur 42. The spur 42 is rotatably supported by the holding member 16 via a spring shaft 42*a*, and is also biased against the discharge roller 41 by the spring shaft 42*a*. The regulation member 12 is supported by the holding member 16 via the shaft 12*a*.

The holding member 16, a base member 17, and a height adjustment member 18 are each a long member extended in the Y direction. The base member 17 and the height adjustment member 18 are fixed by screws 50 at a plurality of points in the Y direction. Each screw 50 passes through a hole in the base member 17 and threadably engages with a screw hole in the height adjustment member 18. The hole in the base member 17 is a hole with a margin, and the height of the height adjustment member 18 can be adjusted by the attachment position of the screw 50 to the hole. The holding member 16 and the height adjustment member 18 are fixed by screws 51 at a plurality of points in the Y direction.

FIGS. 6A to 7B are explanatory views showing an example in which a lift of a print medium is regulated. An example in which the roll sheet SH2 is conveyed will be described here, and the description also applies to the sheet SH1.

Figure 6A:
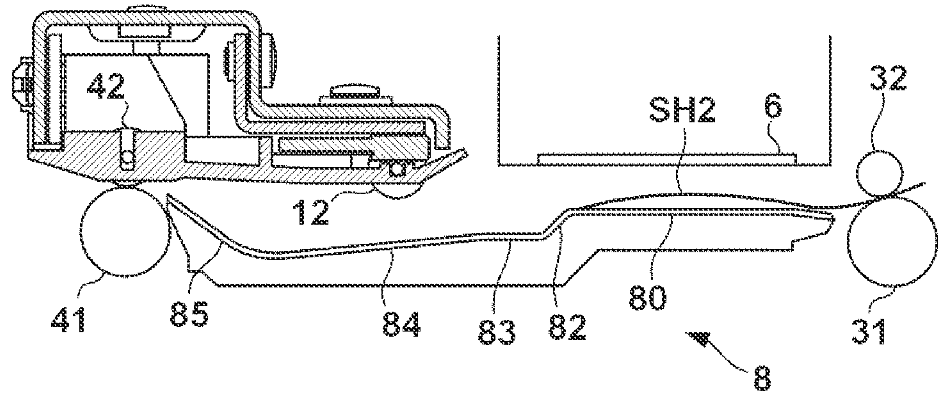
FIGS. 6A to 6C are explanatory views showing an example in which a lift of a print medium is regulated.
Figure 6B:
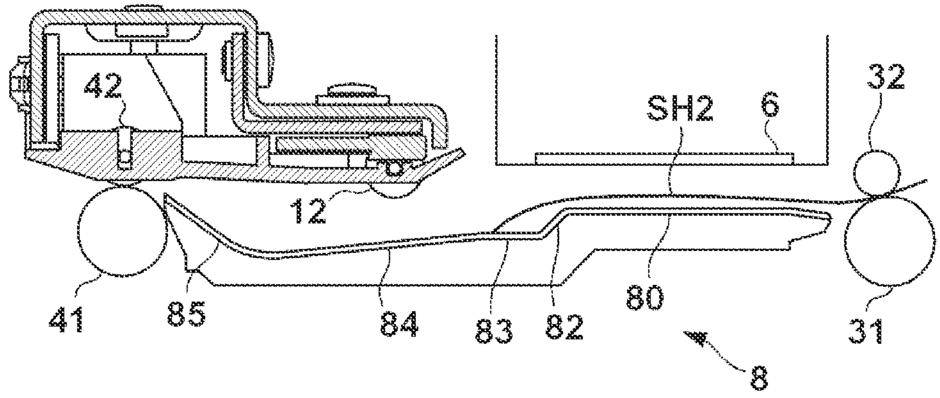

FIG. 6A shows a stage in which the leading edge of the roll sheet SH2 is moving on the platen section 80. Printing is sometimes started at this stage by discharging ink from the printhead 6. When the conveyance of the roll sheet SH2 progresses, the leading edge of the roll sheet SH2 passes through the declined section 82 and reaches the connecting section 83, as shown in FIG. 6B.

Since the declined section 82 guides the leading edge of the roll sheet SH2 downward, even if the roll sheet SH2 is curled downward, it can be prevented from lifting to the side of the printhead 6. In particular, since the declined section 82 is a relatively steep declination, even if the curl near the leading edge of the roll sheet SH2 is strong, the lift of the roll sheet SH2 can be reduced.

Figure 6C:
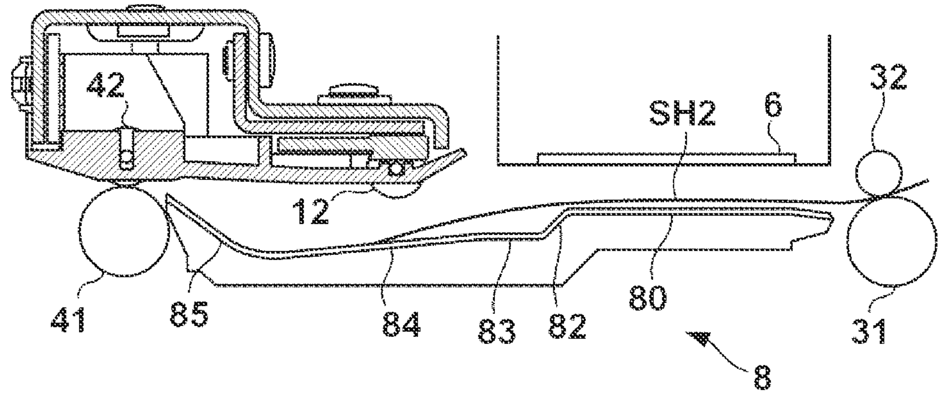

When the conveyance of the roll sheet SH2 progresses, the leading edge of the roll sheet SH2 reaches the declined section 84, as shown in FIG. 6C. The declined section 84 guides the leading edge of the roll sheet SH2 downward, and a state in which the lift of the roll sheet SH2 is little can be continued. If the declined section 84 is a flat surface, like the connecting section 83, the lift of the roll sheet SH2 may grow depending on the curl state of the roll sheet SH2. However, since the relatively moderate declined section 84 guides the leading edge of the roll sheet SH2, the growth of the lift of the roll sheet SH2 is suppressed. The declined section 84 is the longest section in the X direction in the guide section 81, and is a section longer than each of the declined section 82 and the connecting section 83 and also than the total length of the declined section 82 and the connecting section 83. It is possible to, by the declined section 84, ensure the conveyance distance from the printhead 6 to the discharge unit 4 while suppressing the growth of the lift of the roll sheet SH2.

Figure 7A:
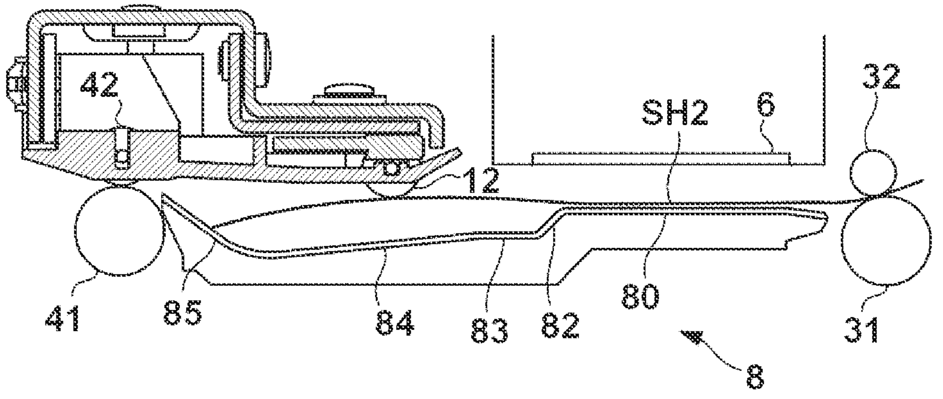
FIGS. 7A and 7B are explanatory views showing an example in which a lift of a print medium is regulated.

When the conveyance of the roll sheet SH2 progresses, the leading edge of the roll sheet SH2 reaches the inclined section 85, as shown in FIG. 7A. For this reason, the lift of the roll sheet SH2 grows. However, since the lift of the roll sheet SH2 is regulated by the regulation member 12, as shown in FIG. 7A, a lift of the roll sheet SH2 immediately under the printhead 6 can be suppressed.

In this embodiment, to control the position where the lift of the roll sheet SH2 grows, the declined section 84 and the inclined section 85 are continued. That is, on the declined section 84, the growth of the lift of the roll sheet SH2 is suppressed by the declination. On the other hand, the lift abruptly grows on the inclined section 85. In particular, since the curved section 85*a* is formed at the end section of the inclined section 85 on the upstream side, the lift of the roll sheet SH2 abruptly grows. However, the lift of the roll sheet SH2 can be suppressed by the regulation member 12.

Thus, in this embodiment, the position where the lift of the roll sheet SH2 occurs is structurally limited, and the lift of the roll sheet SH2 is regulated by the regulation member 12 in correspondence with this position. It is possible to prevent the position where the lift occurs from varying depending on the stiffness or the degree of curling of the roll sheet SH2 and control the position where the lift occurs and thus effectively suppress the lift.

Figure 7B:
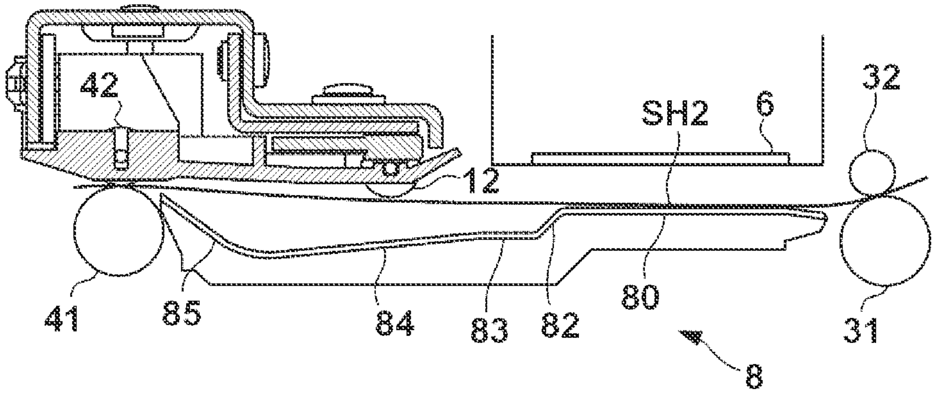

When the conveyance of the roll sheet SH2 progresses, the leading edge of the roll sheet SH2 reaches the nip section of the discharge unit 4, as shown in FIG. 7B. Since the height H3 of the nip position of the discharge unit 4 is located at a position higher than the regulation position H2 of the regulation member 12, the lift of the roll sheet SH2 is continuously regulated by the regulation member 12.

Thus, in this embodiment, the position where a lift of the print medium occurs is controlled, thereby suppressing it. According to this embodiment, even if the platen section 80 does not have, for example, a structure for sucking the print medium, a lift of the print medium can be suppressed, and the printing apparatus 1 of low cost and small size can be provided.

<Skip Section>

A change of the conveyance state of the print medium affects the print quality or print efficiency. An example of the factor that changes the conveyance state is a factor derived from the position of the leading edge of the print medium. An example is sections M1 and M2 shown in FIG. 4. Note that these sections will sometimes be referred to as skip sections. Where the sections M1 and M2 are not discriminated, these will sometimes collectively be referred to as a section M.

The skip section M is the section of a part on the conveyance path of the print medium. The skip section M1 is a section including at least a part of the inclined section 85. In this embodiment, the skip section M1 is particularly a section from the curved section 85*a* to the middle of the linear section 85*b*. In this embodiment, a lift of the print medium is regulated by the regulation member 12. However, when the leading edge of the print medium passes through the skip section M1, a lift of the print medium may occur. A lift of the print medium occurs at high possibility when the roll sheet SH2 is used rather than the cut sheet SH1. If a lift of the print medium remarkably occurs, the printhead 6 and the print medium may contact, and therefore, the print medium may become dirty, or a jam may occur.

The skip section M2 is a section including the conveyance start position of the discharge unit 4 (the nip section between the discharge roller 41 and the spur 42). When the leading edge of the print medium reaches the nip section between the discharge roller 41 and the spur 42, the state changes from a state in which the print medium is conveyed by the conveyance unit 3 to a state in which the print medium is conveyed by the conveyance unit 3 and the discharge unit 4. At the time of change of the conveyance state, the conveyance amount (conveyance distance) of the print medium may vary.

In particular, if control of applying a unique correction value in control to each of a case in which the print medium is conveyed by the conveyance unit 3 and a case in which the print medium is conveyed by the conveyance unit 3 and the discharge unit 4 is being executed to more accurately convey the print medium, the conveyance amount readily varies.

More specifically, in this control, when the leading edge of the print medium has reached the nip section of the discharge unit 4, the correction value is switched. However, depending on the type of the print medium, the curl state, and the temperature and humidity of the installation environment of the printing apparatus 1, the timing when the leading edge of the print medium actually reaches the nip section of the discharge unit 4 varies. Even if the leading edge of the print medium has not actually reached the nip section of the discharge unit 4, the correction value may be switched, and the conveyance amount may vary because of the variation of timing. This is a factor for lowering image quality.

Note that the influence that the change between the conveyance amount of the print medium using the conveyance unit 3 and the conveyance amount of the print medium using the conveyance unit 3 and the discharge unit 4 gives to the image quality tends to be large when the type of the print medium is not plain paper but glossy paper. Also, the influence tends to be larger in the cut sheet SH1 than in the roll sheet SH2.

Hence, in this embodiment, printing is regulated while the leading edge of the print medium is located in the skip section M. As an example of regulation, the printing operation is not performed, and movement of the carriage 7 and ink discharge from the printhead 6 are not performed. As a detailed operation, conveyance control is performed such that the print medium passes through the skip section M in one conveyance operation. This prevents the printing operation from being performed in a state in which the leading edge of the print medium is located in the skip section M.

Figure 8:
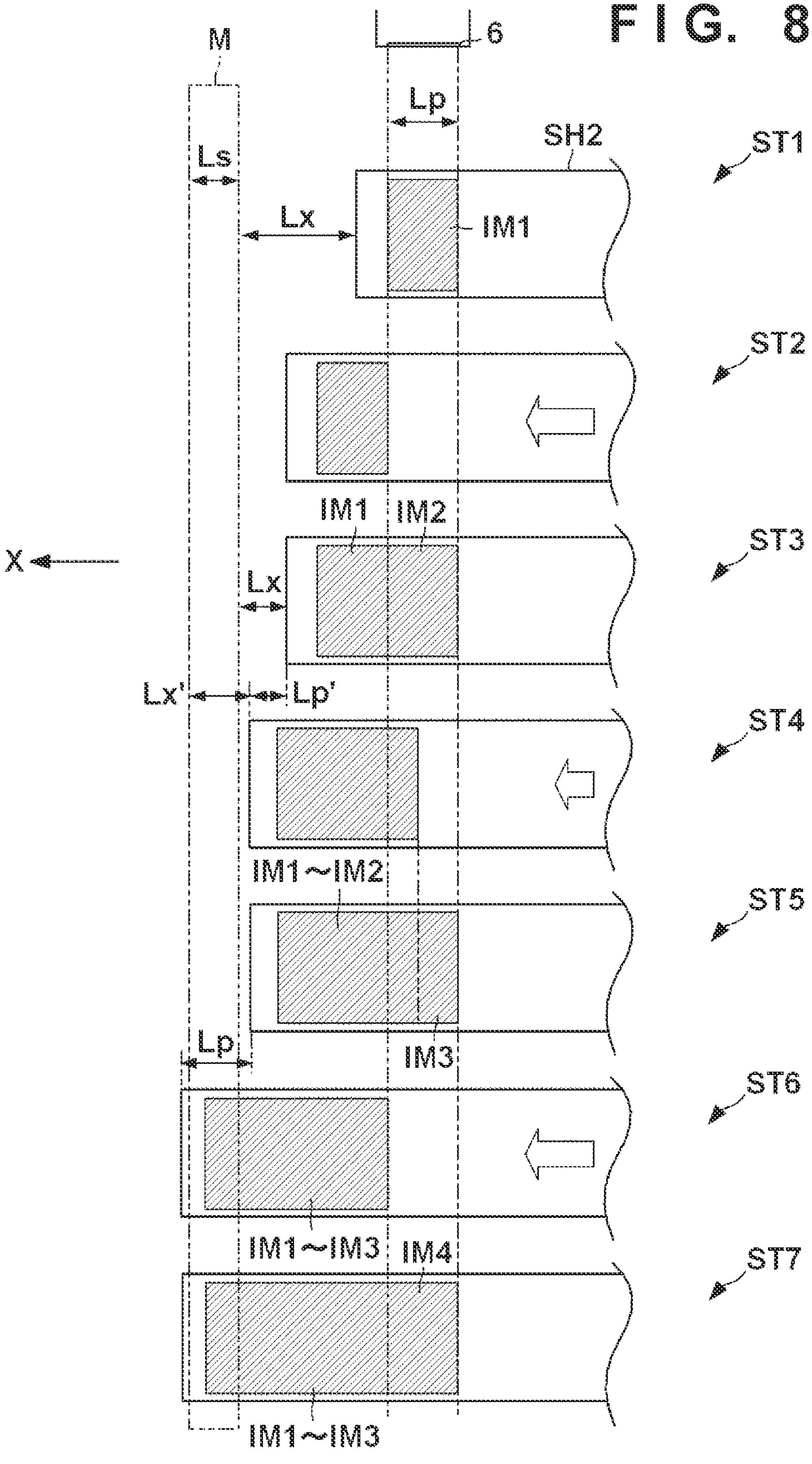
FIG. 8 is an explanatory view of print control in a set section.

FIG. 8 is an explanatory view of print control before and after the skip section M. Here, a case in which the roll sheet SH2 is used as the print medium will be exemplified. The same print control can be applied to the cut sheet SH1 as well.

In FIG. 8, a length Lp is a predetermined distance (basic conveyance distance) for conveyance to the next image printing position. The printhead 6 includes a plurality of ink discharge ports in the X direction. The X-direction width to be printable by one printing operation can be changed up to the maximum print width that is the distance from the nozzle on the most upstream side to the nozzle on the most downstream side in the printhead 6. For this reason, the maximum width of the length Lp corresponds to the distance from the nozzle on the most upstream side to the nozzle on the most downstream side in the printhead 6. A length Lx is the X-direction distance from the leading edge of the print medium to the skip section M, and is the remaining distance until the leading edge of the print medium reaches the skip section M. The length Lx is calculated from the leading edge position of the roll sheet SH2 and the position of the skip section M. If the leading edge position exceeds the skip section M, the length Lx may evenly be set to 0 for the sake of control operations. A length Ls is the X-direction width of the skip section M. The relationship between the length Ls and the maximum print width from the nozzle on the most upstream side to the nozzle on the most downstream side in the printhead 6 is given by maximum print width>Ls.

A state ST1 shows a stage in which an image IM1 is printed on the roll sheet SH2 by a printing operation. Since Lx>Lp, in a state ST2, the roll sheet SH2 is conveyed by a conveyance operation by the distance Lp that is the basic conveyance distance.

A state ST3 shows a stage in which an image IM2 is printed on the roll sheet SH2 by a printing operation. Since $Lx<Lp<(Lx+Ls)$, if the roll sheet SH2 is conveyed by the next conveyance operation by the distance Lp that is the basic conveyance distance, the roll sheet SH2 is located in the range of the skip section M.

To avoid this situation, in the next conveyance operation, the roll sheet SH2 is conveyed by a distance Lp' shorter than the distance Lp as indicated by a state ST4. The distance Lp' is set such that $Lp'<Lx$ holds.

Next, as shown in a state ST5, a printing operation is executed to print an image IM3 on the roll sheet SH2. When printing the image IM3, the print range of the printhead 6 is changed in correspondence with the distance Lp' in the conveyance operation, and the X-direction width of the print range is set to Lp' from the upstream side.

Next, as shown in a state ST6, a conveyance operation is performed. The conveyance distance of the roll sheet SH2 at this time is a conveyance distance longer than at least the skip section M, and therefore, the leading edge of the roll sheet SH2 passes through the skip section M. Here, since Lp>Lx' is set in the state ST4, the distance is returned to the length Lp that is the basic conveyance distance. Next, as shown in a state ST7, a printing operation is performed to print an image IM4 on the roll sheet SH2. When printing the image IM4, the print range of the printhead 6 is returned to the initial state in correspondence with the distance Lp in the conveyance operation, and the X-direction width of the print range is set to Lp.

By the above-described control, it is possible to avoid a situation in which the printing operation is performed in a state in which the leading edge of the print medium is located in the skip section M.

Note that if Lp>(Lx+Ls) holds in the stage of the state ST3, the conveyance distance of the roll sheet SH2 need not be changed to Lp', as a matter of course. Also, at the stage of the state ST6, the conveyance distance of the roll sheet SH2 need not always be the length Lp because the leading edge need only exceed the skip section M.

Also, in the example shown in FIG. 8, an example in which the images IM1 to IM4 form one continuous image has been described. However, in the print control, in some cases, a plurality of discontinuous images with margins interposed therebetween are formed because of existence of page separation halfway. In this case, considering the conveyance distance corresponding to the margin, it is determined whether the leading edge of the roll sheet SH2 is located in the skip section M in the next printing operation, and upon determining that the leading edge is located in the skip section M, control for, for example, changing the conveyance distance is performed.

In addition, the length Lp may be shorter than the distance from the nozzle on the most upstream side to the nozzle on the most downstream side in the printhead 6. Also, in the example shown in FIG. 8, control for changing the conveyance distance and the print range from Lp to Lp' because the leading edge of the roll sheet SH2 exceeds the skip section M is performed only once. However, the length Lp' may be decreased, and the control may be performed a plurality of times. This is effective in a case of multi-pass printing in which one image is completed by image printing with a plurality of times of printing operations. For example, in 2-pass printing, distance Lp=maximum print width/2 can be set. In 4-pass printing, distance Lp=maximum print width/4 can be set. To make the leading edge pass through the skip section M by a single operation, the conveyance amount may be increased within the range of the maximum print width.

<Example of Control>

Figures 9A, 9B:
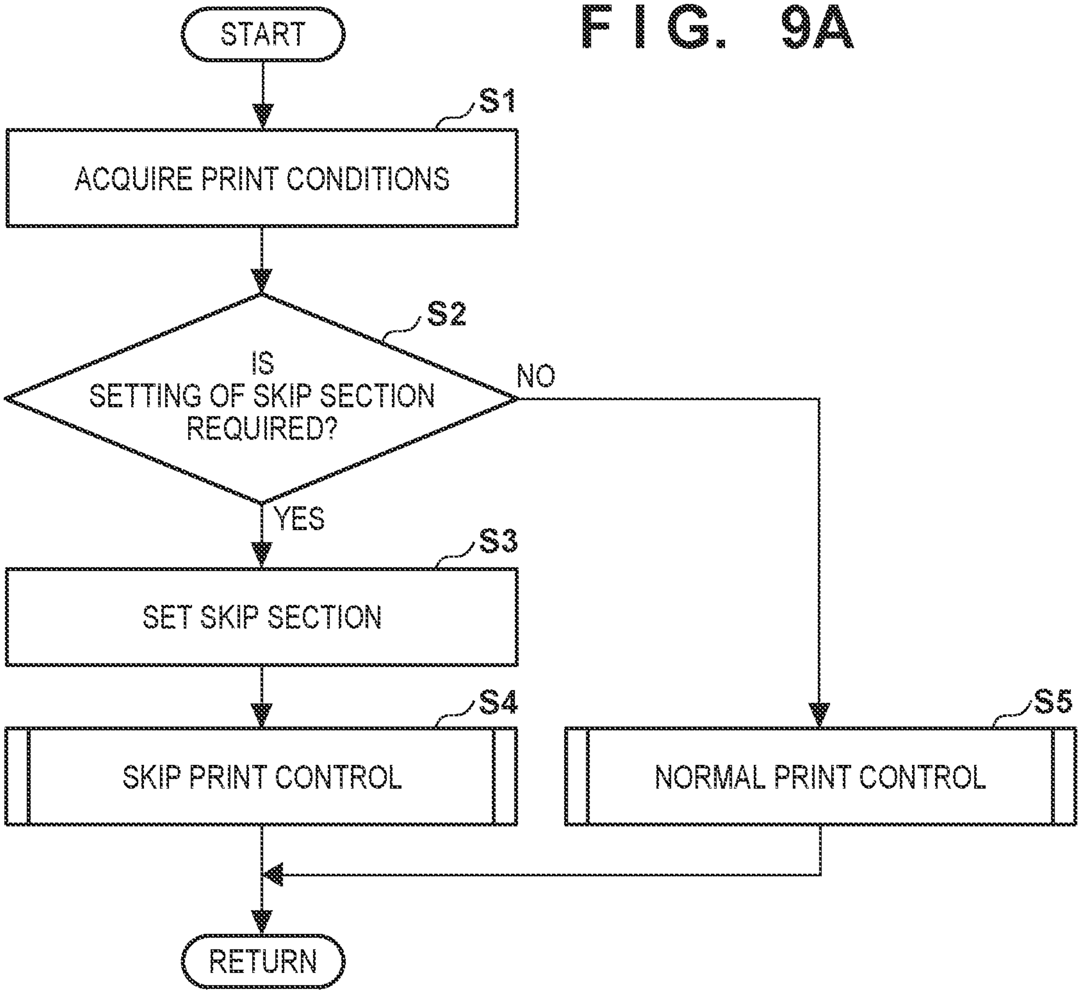
FIG. 9A is a flowchart showing an example of processing executed by the control unit.
FIG. 9B is a view showing an example of setting conditions of a skip section.

An example of processing executed by the MPU 140 of the control unit 14 to perform the control shown in FIG. 8 will be described. FIG. 9A is a flowchart showing an example of processing of print control. In this example, setting/non-setting of the skip section is switched in accordance with print conditions. If a set section exists, control (to be referred to as skip print control) shown in FIG. 8 is performed. If a set section does not exist, normal print control is performed. In the skip print control, the numbers of printing operations and conveyance operations tend to increase, and this may affect throughput. Instead of uniformly performing skip print control, skip print control or normal print control is selectively executed in accordance with the print conditions, thereby implementing both prevention of print quality degradation and jam occurrence and maintaining of throughput.

In step S1, print conditions in a current print job are acquired. The print conditions are, for example, received from the host computer 15 and stored in the storage device 141. In step S1, the print conditions are acquired by reading out those stored in the storage device 141. In step S2, the necessity of setting of the skip section M is determined based on the print conditions acquired in step S1. If it is determined based on the conditions acquired in step S1 that the setting is necessary, the process advances to step S3. If it is determined that the setting is not necessary, the process advances to step S5.

FIG. 9B shows an example of rules for determining setting/non-setting of the skip sections M1 and M2 based on print conditions. FIG. 9B shows an example of a table used to switch setting/non-setting of the skip sections M1 and M2 in accordance with the type of the print medium used for printing.

In the example shown in FIG. 9B, the skip section M1 is set for a roll sheet, and the skip section M1 is non-set for a cut sheet. This is based on the fact that a lift of a print medium relatively hardly occurs in a cut sheet. Also, in the example shown in FIG. 9B, the skip section M2 is set for glossy paper, and the skip section M2 is non-set for plain paper. This is based on the fact that higher print quality is required in printing using glossy paper than in printing using plain paper, and a relatively high print speed is required in printing using plain paper.

The print conditions used to switch setting/non-setting of the skip section M can include not only the type of the print medium but also the winding diameter of a roll sheet. The degree of curling of the leading edge of a roll sheet is affected by the winding diameter of the roll sheet. At a stage in which the degree of curling is relatively small, and the winding diameter is large, the skip section M1 may be non-set. At a stage in which the degree of curling is relatively large, and the winding diameter is small, the skip section M1 may be set.

The print conditions used to switch setting/non-setting of the skip section M can also include at least one of the temperature and humidity of the installation environment of the printing apparatus 1. Depending on the temperature or humidity of the installation environment of the printing apparatus 1, the degree of curling or the expansion/contraction amount of a print medium, the degree of slip in the nip section, and the like change. Hence, when setting/non-setting of the skip section M is switched based on the temperature or humidity, it is possible to implement both prevention of print quality degradation and jam occurrence and maintaining of throughput.

Referring back to FIG. 9A, in step S3, the skip section M is set. In step S4, skip print control is executed. In step S5, normal print control is executed.

Figure 10:
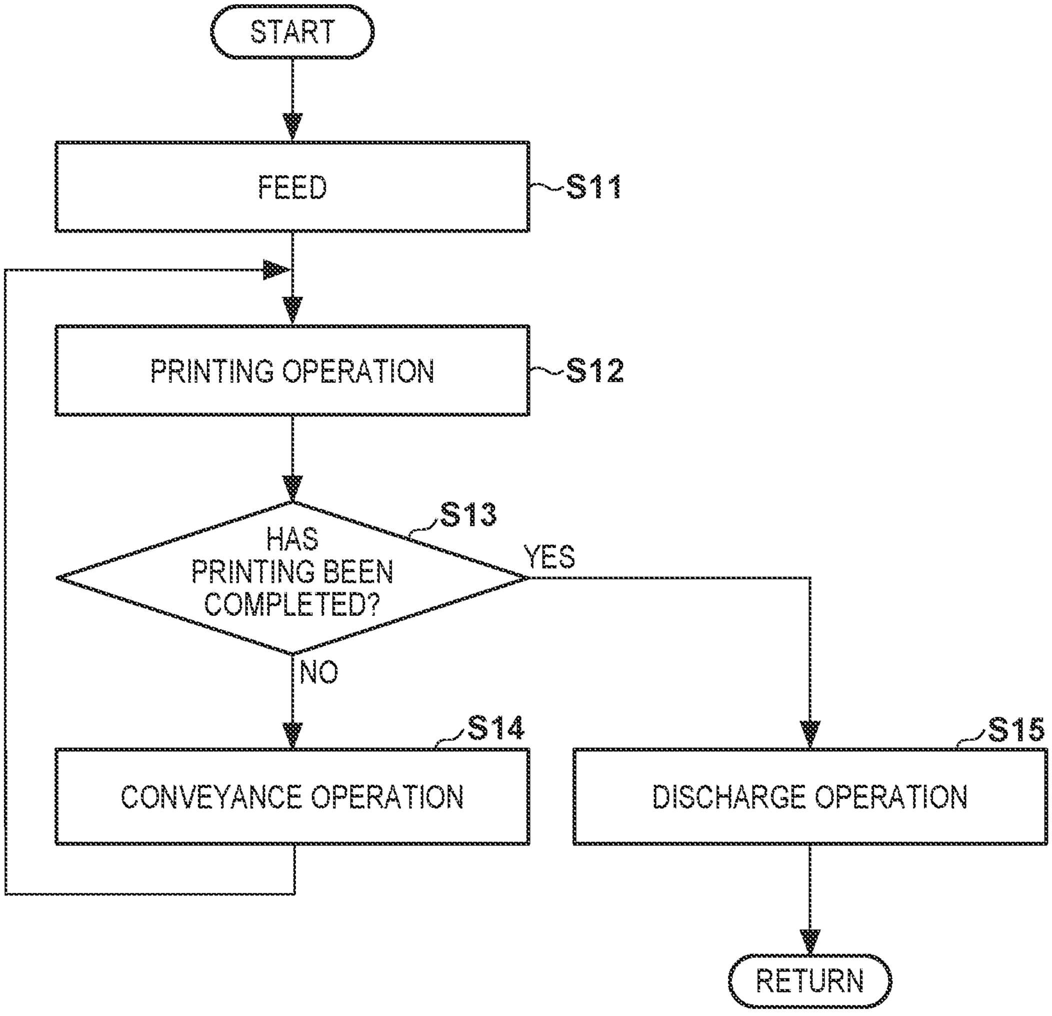
FIG. 10 is a flowchart showing an example of processing executed by the control unit.

FIG. 10 is a flowchart showing an example of normal print control in step S5. After the print medium (the cut sheet SH1 or the roll sheet SH2) is caused to abut against the nip section of conveyance unit 3 by the feed operation, in step S11, cueing of the print medium is performed. More specifically, in accordance with a margin amount specified in the print job, the print medium is conveyed by the conveyance unit 3 such that the print start position on the print medium is located at a position corresponding to the printhead 6. After that, printing is started. In step S12, the printing operation is performed. In step S13, it is determined whether printing is completed. If printing is not completed, the process advances to step S14. If printing is completed, the process advances to step S15.

After the start of printing, the conveyance operation is performed in step S14, and the process then returns to step S12. In step S15, a discharge operation is performed. The print medium is conveyed to the outside of the apparatus by the discharge unit 4. If the print medium is the roll sheet SH2, the roll sheet SH2 is cut by the cutting unit 5.

Figure 11:
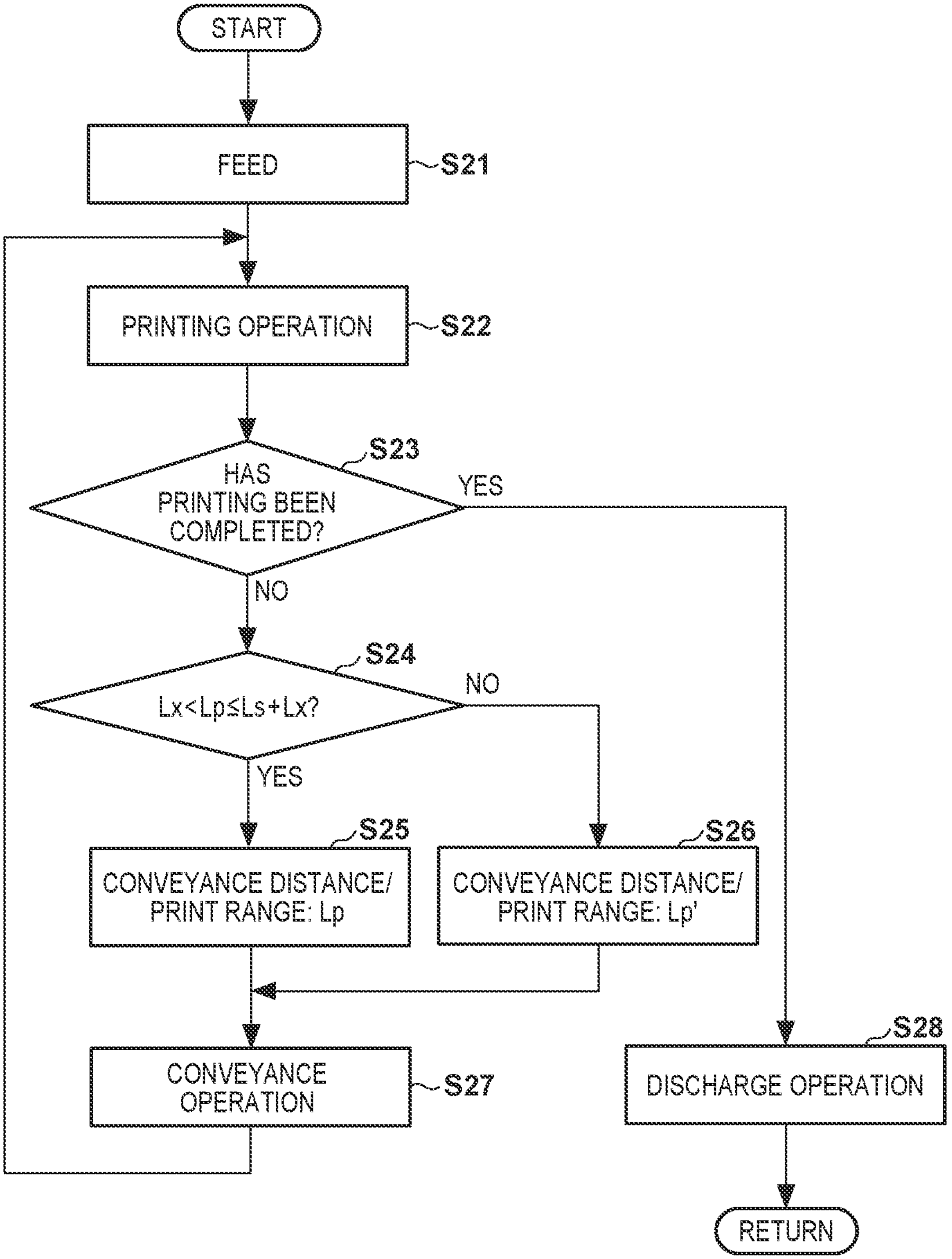
FIG. 11 is a flowchart showing an example of processing executed by the control unit.

FIG. 11 is a flowchart showing an example of skip print control in step S4. After the print medium (the cut sheet SH1 or the roll sheet SH2) is caused to abut against the nip section of conveyance unit 3 by the feed operation, in step S21, cueing of the print medium is performed. This is the same processing as step S11. After that, printing is started. In step S22, the printing operation is performed. In step S23, it is determined whether printing is completed. If printing is not completed, the process advances to step S24. If printing is completed, the process advances to step S28.

After the start of printing, in step S24, it is determined whether the relationship between the lengths Ls. Lp, and Lx described with reference to FIG. 8 is Lx<Lp≤(Ls+Lx). If this relationship is not held, the process advances to step S25. If the relationship is held, the process advances to step S26. In step S25, the conveyance distance of the print medium and the print range of the printhead 6 are set to the length Lp that is the basic conveyance distance. In step S26, the conveyance distance of the print medium and the print range of the printhead 6 are set to the length Lp' shown in FIG. 8.

In step S27, the print medium is conveyed by the length Lp or Lp' set in step S25 or S26, and the process returns to step S22. In step S22, the printing operation is performed in the print range of the length Lp or Lp' set in step S25 or S26.

In step S28, a discharge operation is performed. The print medium is conveyed to the outside of the apparatus by the discharge unit 4. If the print medium is the roll sheet SH2, the roll sheet SH2 is cut by the cutting unit 5.

As described above, in this embodiment, printing is regulated while the leading edge of the print medium is passing through the skip section M. This can provide a print control technique corresponding to the change of the conveyance state of the print medium. If there is a possibility that the print medium lifts and contacts the printhead 6 or a possibility that the conveyance amount of the print medium varies, it is possible to avoid printing being performed. It is possible to prevent dirt on the print medium, jam occurrence, and print quality degradation.

Second Embodiment

While the leading edge of a print medium is passing through a skip section M, the reversing position of a carriage 7 in the moving direction may be switched. In print control, a printhead 6 mounted on the carriage 7 is reciprocated to cross over the print medium in the Y direction, and the moving direction of the carriage 7 is reversed between forward and backward paths. When throughput is taken into consideration, it is advantageous that the reversing position of the carriage 7 in the moving direction is set close to the print medium because the moving distance of the carriage 7 becomes short. On the other hand, when the reversing position is close to the print medium, if the print medium lifts during a conveyance operation, the print medium may contact the printhead 6 of the carriage 7 standing by at the reversing position. Although not during the printing operation, it is preferable to avoid contact between the printhead 6 and the print medium.

Figure 12:
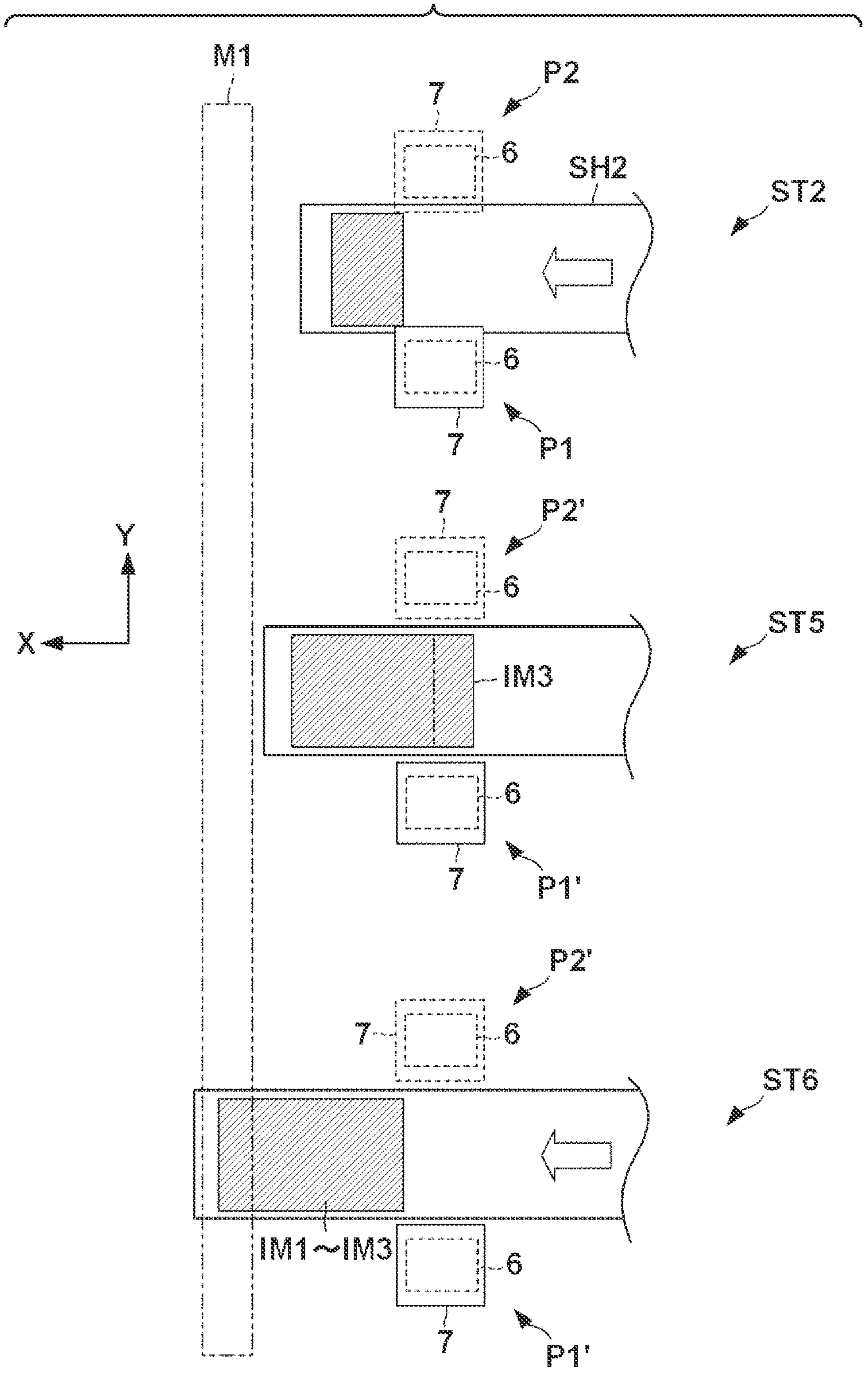
FIG. 12 is an explanatory view showing an example of switching of the standby position of a carriage.

Hence, in a skip section M1 where the print medium may lift, the reversing position of the carriage 7 may be switched to a position far apart from the print medium. FIG. 12 is an explanatory view. States ST2, ST5, and ST6 in FIG. 12 correspond to the states ST2, ST5, and ST6 in FIG. 8.

The state ST2 in FIG. 12 shows a stage of a conveyance operation in a case in which the leading edge of a roll sheet SH2 does not exist in the skip section M1. The carriage 7 stands by at one of a reversing position P1 and a reversing position P2. In the example shown in FIG. 12, the carriage 7 is conveniently assumed to stand by at the reversing position P1, and the carriage 7 at the reversing position P1 is indicated by a solid line. The carriage 7 at the reversing position P2 is indicated by a virtual line (broken line). At the reversing position P1 or P2, the carriage 7 is located at a position overlapping the roll sheet SH2 in the Y direction.

The state ST5 in FIG. 12 shows a stage in which the printing operation is ended at the stage in which the leading edge of the roll sheet SH2 approaches the skip section M1. The carriage 7 stands by at one of a reversing position P1' and a reversing position P2'. The reversing position P1' or the reversing position P2' is a position far apart from the roll sheet SH2 as compared to the reversing positions P1 and P2. At the reversing position P1' or the reversing position P2', the carriage 7 is located at a position not to overlap the roll sheet SH2 in the Y direction.

The state ST6 in FIG. 12 shows a stage of a conveyance operation in which the leading edge of the roll sheet SH2 passes through the skip section M1. Since the carriage 7 stands by at one of the reversing position P1' and the reversing position P2', even if the roll sheet SH2 lifts, contact between the printhead 6 and the roll sheet SH2 can be avoided.

Third Embodiment

Figure 13:
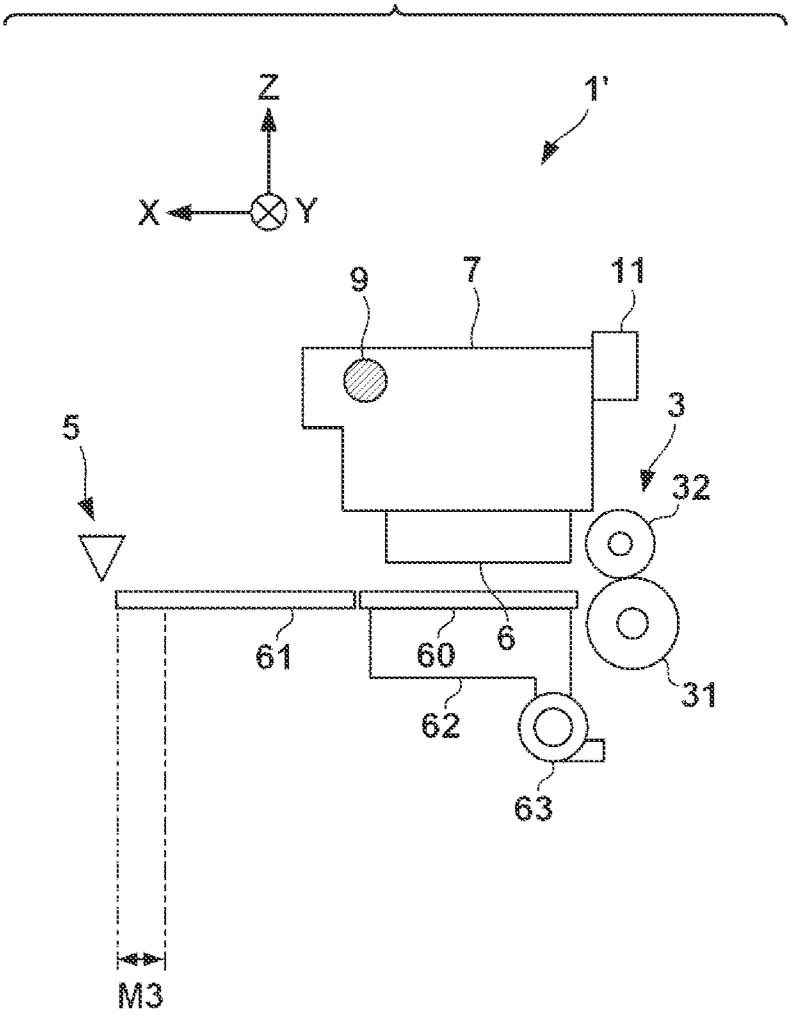
FIG. 13 is an explanatory view showing another example of the skip section.

Another example of a skip section M will be described. FIG. 13 is a schematic view showing the peripheral structure of a carriage 7 of a printing apparatus 1' according to this embodiment.

The printing apparatus 1' includes a platen 60 facing a printhead 6. The platen 60 supports a print medium from the lower side and guarantees a gap between the printhead 6 and the print medium. A guide member 61 is provided on the downstream side of the platen 60, and supports the print medium from the lower side and guides the conveyance of that.

A plurality of suction holes (not shown) are formed in the platen 60 and connected to a suction fan 63 via a duct 62 on the lower side of the platen 60. When the suction fan 63 is driven, a suction negative pressure is generated in the suction holes of the platen 60, thereby sucking and holding the print medium on the platen 60. If there are many suction holes not covered with the print medium, air is drawn from the suction holes, and the suction negative pressure may be lowered. For example, if the print medium has a small size (a narrow width in the Y direction), the number of suction holes not covered with the print medium increases, and the suction negative pressure acting on the print medium decreases.

If an appropriate suction negative pressure is not generated, the print medium may lift near the printhead 6, and the printhead 6 and the print medium may contact. Then, as the print medium is conveyed to the downstream side of the guide member 61, the lift of the print medium may grow near the printhead 6. If the leading edge of the print medium passes through the cutting unit 5, there is no member for guiding the leading edge of the print medium anymore, and therefore, the leading edge of the print medium starts lowering. As a result, the lift of the print medium becomes small near the printhead 6.

Hence, a skip section M3 may be set on the downstream side of the guide member 61, as shown in FIG. 13. When the skip section is set in the region on the downstream side of the guide member 61, where the lift of the print medium may grow, contact between the printhead 6 and the lifted print medium or execution of a printing operation for the lifted print medium can be avoided.

Switching of setting/non-setting of the skip section M3 may be done in consideration of the type of the print medium and, more particularly, the size of the print medium. If the print medium has a large size (a wide width in the Y direction), the skip section M3 may be non-set. If the print medium has a small size (a narrow width in the Y direction), the skip section M3 may be set.

Fourth Embodiment

In the above-described embodiments, a serial type printing apparatus has been exemplified. However, it may be a full line head type printing apparatus in which the printhead is extended in the Y direction. In this case, conveyance of a print medium may be continuous conveyance, and ink discharge from the full line head may not be performed while the leading edge of the print medium is passing through a skip section M.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-027012, filed Feb. 24, 2022, which is hereby incorporated by reference herein in its entirety.

What is claimed is:

1. A printing apparatus comprising:

a conveyance unit arranged on an upstream side of a printing unit with respect to a conveyance direction of a print medium and configured to convey the print medium to the printing unit;

a support unit configured to support, from a lower side, the print medium conveyed by the conveyance unit, the support unit including a platen section facing the printing unit, and a guide section extended from the platen section to a downstream side in the conveyance direction; and a control unit configured to, after a start of printing of the print medium by the printing unit, regulate the printing by the printing unit during a time when a leading edge of the print medium conveyed by the conveyance unit is passing through a set section preset on a conveyance path of the print medium, wherein, the guide section includes an inclined section inclined in a direction of approaching a support height of the print medium in the platen section to the downstream side in the conveyance direction, and the set section is a section including at least a part of the inclined section.

2. The apparatus according to claim 1, further comprising:

a discharge unit arranged on the downstream side of the printing unit in the conveyance direction and configured to discharge the print medium conveyed by the conveyance unit, wherein the set section includes a first set section and a second set section, the first set section is a section including at least a part of the inclined section, and the second set section is a section including a conveyance start position by the discharge unit.

3. The apparatus according to claim 1, wherein setting and non-setting of the set section are switchable and are switched based on a print condition.

4. The apparatus according to claim 1, wherein setting and non-setting of the set section are switchable and are switched based on a type of the print medium.

5. The apparatus according to claim 4, wherein the type of the print medium includes a roll sheet or a cut sheet.

6. The apparatus according to claim 4, wherein the type of the print medium includes a size of the print medium.

7. The apparatus according to claim 1, wherein the print medium is a roll sheet, and setting and non-setting of the set section are switchable and are switched based on a winding diameter of the roll sheet.

8. The apparatus according to claim 1, wherein setting and non-setting of the set section are switchable and are switched based on a temperature and/or a humidity of an installation environment of the printing apparatus.

9. A control method of a printing apparatus including a conveyance unit arranged on an upstream side of a printing unit with respect to a conveyance direction of a print medium and configured to convey the print medium to the printing unit; and a support unit configured to support, from a lower side, the print medium conveyed by the conveyance unit, the support unit including a platen section facing the printing unit and a guide section extended from the platen section to a downstream side in the conveyance direction, the guide section including an inclined section inclined in a direction of approaching a support height of the print medium in the platen section to the downstream side in the conveyance direction, the method comprising:

after a start of printing of the print medium by the printing unit, regulating the printing by the printing unit during a time when a leading edge of the print medium conveyed by the conveyance unit is passing through a set section preset on a conveyance path of the print medium, wherein the set section is a section including at least a part of the inclined section.

10. A non-transitory computer-readable storage medium storing a program configured to cause a computer to execute a control method of a printing apparatus including a conveyance unit arranged on an upstream side of a printing unit with respect to a conveyance direction of a print medium and configured to convey the print medium to the printing unit; and a support unit configured to support, from a lower side, the print medium conveyed by the conveyance unit, the support unit including a platen section facing the printing unit and a guide section extended from the platen section to a downstream side in the conveyance direction, the guide section including an inclined section inclined in a direction of approaching a support height of the print medium in the platen section to the downstream side in the conveyance direction, the control method comprising:

after a start of printing of the print medium by the printing unit, regulating the printing by the printing unit during a time when a leading edge of the print medium conveyed by the conveyance unit is passing through a set section preset on a conveyance path of the print medium, wherein the set section is a section including at least a part of the inclined section.

* * * * *